United States Patent [19]

Reese et al.

[11] Patent Number: 5,086,079
[45] Date of Patent: Feb. 4, 1992

[54] PROCESS FOR PRODUCING STYRENE POLYMERS WITH NARROW PARTICLE SIZE DISTRIBUTION

[75] Inventors: Dirk Reese, Horst Leithaeuser, both of Marl, Fed. Rep. of Germany

[73] Assignee: Huels Aktiengesellschaft, Marl, Fed. Rep. of Germany

[21] Appl. No.: 638,157

[22] Filed: Jan. 10, 1991

Related U.S. Application Data

[63] Continuation of Ser. No. 207,194, Jun. 16, 1988, abandoned.

Foreign Application Priority Data

[30]

Aug. 22, 1987 [DE] Fed. Rep. of Germany ....... 3728044

[51] Int. Cl.$^5$ ............... C08J 9/18; C08F 12/08
[52] U.S. Cl. ............................... 521/56; 526/89; 526/200; 526/201; 526/215; 526/221; 526/233; 526/234; 526/346; 526/910
[58] Field of Search ........... 526/201, 346, 910, 89, 526/200, 215, 221, 233, 234; 521/56

[56] References Cited

U.S. PATENT DOCUMENTS

| | | | |
|---|---|---|---|
| 3,222,340 | 12/1965 | Harris | 526/346 |
| 3,222,343 | 12/1965 | Ingram et al. | 526/346 |
| 3,931,133 | 1/1976 | Desilles | 526/226 |
| 3,962,197 | 6/1976 | Khanna | 526/202 |
| 4,241,191 | 12/1980 | Keppler et al. | 526/201 |

OTHER PUBLICATIONS

Official Gazette 1046 TMOG 2 Sept. 4, '84.

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

A process for producing styrene-containing polymers having a narrow particle size distribution, comprising the steps:

(i) preparing a polymerization mixture, said mixture comprising
  a) an organic phase comprising at least 50 wt %. styrene and a monomer-soluble polymerization initiator, and
  b) an aqueous phase comprising water, an organic protective colloid and a substantially water insoluble inorganic suspension stabilizer;
(ii) adding to said polymerization mixture 50-500 ppm of a metal carbonate, bicarbonate or mixtures thereof based on said aqueous phase; and
(iii) polymerizing said polymer mixture to produce said styrene-containing polymer particles.

12 Claims, No Drawings

PROCESS FOR PRODUCING STYRENE POLYMERS WITH NARROW PARTICLE SIZE DISTRIBUTION

This application is a continuation of application Ser. No. 07/207,194, filed on June 16, 1988, now abandoned.

BACKGROUND OF THE INVENTION

1. Field of the Invention

The invention is directed to a method of producing styrene polymers having a narrow particle size distribution. More specifically, the invention is directed to a process of preparing narrow particle size distribution styrene-containing polymers, in which the particle size distribution is controlled by the addition of metal carbonates and/or bicarbonates to the polymerization mixture.

2. Discussion of the Background

Styrene polymers can be obtained by the procedure of so-called bead polymerization or suspension polymerization in an aqueous dispersion. This process is used especially in the production of expandable or foamable styrene polymers. Water-soluble organic polymers that are called protective colloids are ordinarily used as suspension stabilizers. Finely divided powders such as calcium or barium sulfate or calcium phosphate can also be used to stabilize the suspension droplet. Such stabilizer systems are called Pickering stabilizers. A list of industrially used protective colloids can be found, for example, in the article by Trommsdorf and Munster in Schildknecht: Polymer Processes Vol. 29, pages 119 to 120.

The choice of suitable protective colloids has substantial importance for the following reasons:

1. Adjusting for Narrow Particle Size Distributions with Definite Size

Foamable styrene polymers are used for various purposes depending on the bead size; coarse beads (2.5 to 0.8 mm) are used for the production of insulating panels, while finer fractions (0.8 to 0.4 mm in diameter) are used for the production of packing material. It is therefore necessary for beads in the particular desired particle size range to be formed in adequate amount, i.e., in high yield.

The occurrence of oversized or undersized grains should be as small as possible. Conventional processes do permit a certain control of the particle size itself, but the distribution curve is still always relatively broad, i.e., the proportion of so-called oversized and/or undersized grains is still too large.

2. Low Internal Water Content of the Beads

In conventional suspension polymerization, it is well known that a certain amount of water is always enclosed in the beads. Polymers with a low content of enclosed water have a uniform foam structure in the foamed state which has a positive effect on the thermal insulation capability of the foam panels. It is therefore desirable for the content of enclosed water, so-called internal water, to be as low as possible.

3. Spherical Shape of the Beads

In the suspension polymerization of styrene free of foaming agent, deformed beads are desirable because of their better processability. In the production of expandable styrene polymers, however, the beads should have as spherical in shape as possible.

4. Adequate Stability of the Suspension Throughout the Entire Polymerization Cycle The suspension for producing expandable styrene polymers is even more labile than that of styrene polymers free of foaming agent. With the reactor sizes customary today of up to 100 m$^3$, the loss of a batch represents substantial damage. It must therefore be guaranteed that in case of problems, the phase separation proceeds so slowly that sufficient time remains to add a polymerization inhibitor.

None of the suspension systems known up to now satisfy all of these requirements at the same time. There has, indeed, been no lack of attempts to find a practical way to meet all four requirements at the same time. As shown by the disclosed art, however, these efforts have been unsuccessful.

A process is described in DE-A-25 48 524 in which suspension stabilizers are used that have been produced by radical polymerization of styrene in the presence of polyvinylpyrrolidone.

DE-B2-25 10 937 describes a method in which the system is initially stabilized weakly in a state of low viscosity with tricalcium phosphate, and post-stabilization occurs several hours later with an aqueous solution of polyvinylpyrrolidone.

It is said that styrene polymers with low internal water content can be produced by both procedures. However, these procedures have the drawback that the particle size of the polymer is determined by the time of addition of the organic protective colloid.

The precise determination of the polymerization conversion in heterogeneous mixtures such as those present during suspension polymerization is difficult. Precise knowledge of the conversion is necessary, however, for reproducible adjustment of the particle size distribution, since the bead size depends on the particular viscosity of the polymerizing phase at which the protective colloid is added.

The polymerization system is also in an uncertain operating state for approximately two hours, which is a particular drawback when using large reactors. A problem such as stirrer failure can lead to destruction of the reactor, particularly at the beginning of polymerization when most of the styrene is still present.

It is proposed in DE-B-20 49 291 to use two protective colloids, namely polyvinyl alcohol with different degrees of hydroxylation, to obtain round beads of uniform size. As the examples indicated show, the ratio of styrene to water chosen must be so unfavorable that the process is uneconomical. The process does not contribute to the selective control of the particle size of the beads.

As already mentioned above, water-insoluble inorganic powders are also used as suspension stabilizers. The use of calcium phosphates is most common. These inorganic compounds as a rule are used in combination with smaller amounts of emulsifiers or surfactants (Houben-Weyl, Methoden der organischen Chemie, 4th Edition, Volume XIV, Part 1, Macromolecular substances, page 425). The use of these systems is restricted in comparison with organic protective colloids, however, since reproducible manipulation and progress of the suspension polymerization without problems is possible only in a narrow range. It is stated in this regard on page 422, last paragraph, lines 6 to 8 of this reference:

> No conditions can be stated under which a powdered dispersing agent would be capable of broader application. With the combination of inorganic compounds with surfactants, the optimal dose must be complied with exactly, since both an underdose and an overdose of the surfactant can result in coagulation of the batch.

It is also known from French Patent 20 79 991 how to modify the shape of the beads either by the amount of suspending agent (protective colloid) or by varying the phase ratio of aqueous to organic phase, or by using a mixture of organic protective colloid and inorganic suspension stabilizer. Spherical beads, or beads with low water content, are not necessarily obtained by this method, because the suspending agent is not added to the aqueous phase prior to polymerization. If the suspending agent is added at the beginning of polymerization, the particle size cannot be set reproducibly.

The similar process of U.S. Pat. No. 3,222,343 also does not meet the required conditions.

A process of suspension polymerization is disclosed in U.S. Pat. No. 3,222,340 which operates in the presence of calcium phosphate as suspension stabilizer. To improve the efficacy of the phosphate, relatively large amounts of a complexing agent are added. This reference does not teach how to narrow the particle size distribution of foamable polystyrene in suspension polymerization in the presence of organic protective colloids.

SUMMARY OF THE INVENTION

Accordingly, one object of the present invention is to provide a method of preparing styrene-containing polymers which have a narrow particle size distribution.

Another object of the invention is a process for preparing narrow particle size distribution styrene-containing polymers which may be used to prepare both expandable and nonexpandable styrene-containing molded objects.

These and other objects which will become apparent from the following specification have been achieved by the present process for producing styrene-containing polymers having a narrow particle size distribution, comprising the steps of:

(i) preparing a polymerization mixture, said mixture comprising
  a) an organic phase comprising at least 50 wt.% styrene and a monomer-soluble polymerization initiator, and
  b) an aqueous phase comprising water, an organic protective colloid and a substantially water insoluble inorganic suspension stabilizer;

(ii) adding to said polymerization mixture 50–500 ppm of a metal carbonate, bicarbonate or mixtures thereof based on said aqueous phase; and (iii) polymerizing said polymer mixture to produce said styrene-containing polymer particles.

DETAILED DESCRIPTION OF THE PREFERRED EMBODIMENTS

Styrene-containing polymers having a narrow particle size distribution are prepared by the polymerization of styrene, optionally mixed with comonomers, in aqueous dispersion in the presence of monomer-soluble initiators, organic protective colloids, and inorganic suspension stabilizers, with addition to the polymerization mixture of 50 to 500 ppm, preferably 100 to 300, especially 100 to 290 ppm of carbonate or bicarbonate based on the aqueous phase.

The carbonate or bicarbonate is added at a monomer conversion of 0 to 40 wt.%, especially 0 to 25 wt.%.

This addition is preferably made in the form of carbonates and/or bicarbonates of metals of the 1st or 2nd main groups of the Periodic System of Elements, or of the 1st to 8th subgroups. Suitable examples include $NaCO_3$, $KCO_3$, $MgCO_3$, $BaCO_3$, $ZnCO_3$, $CuCO_3$, or the corresponding bicarbonates. It is preferred to use carbonates and bicarbonates that are insoluble or slightly soluble in water.

The carbonates of calcium, magnesium, zinc, and copper are particularly advantageous.

The procedure can be used both to produce styrene polymers free of foaming agents and to produce so-called expandable or foamable styrene polymers containing foaming agents. It is particularly suitable in the production of expandable styrene polymers since this system is substantially more unstable.

The procedure is particularly suitable for suspension polymerization in large tanks, i.e., those larger than 10 $m^3$, particularly up to 200 $m^3$.

The process pursuant to the invention solves the problem of producing styrene polymers with narrow particle size distribution. If it is also desired to control the particle size of the styrene polymers, it is suitable to use the known methods for example control of particle sizes by variation of the molecular weight of the protective colloids used, such as those described in European Patent Application 0 137 916. According to this reference, smaller particle sizes are obtained when using higher molecular weight protective colloids, and correspondingly, using lower molecular weight protective colloids when a coarser particle size distribution is desired. It is also possible to control the particle size of the styrene polymers by variation of the concentration of the protective colloid. If it is desired to obtain coarser particles, the amount of protective colloid is reduced. On the other hand, if it is desired to shift the particle size distribution toward smaller sizes, the concentration of protective colloid is increased. This control of particle size is well known in the art.

According to a preferred process, small amounts of a complexing agent are added to the aqueous phase that contains the protective colloid and the water-insoluble suspension stabilizer, to remove all of the undesired extraneous ions introduced that may interfere with the present process. Examples of suitable complexing agents are aminopolycarboxylic acids such as ethylenediaminetetraacetic acid or nitrilotriacetic acid.

The amount of complexing agent is governed by the amount of water-soluble extraneous ions introduced, and can be up to 0.5 wt.% based on the aqueous phase without interfering with the polymerization; in general, 0.0001 to 0.05, preferably 0.0005 to 0.02 wt.% is sufficient.

So-called defective beads can also be added during the polymerization, i.e., oversized or undersized polymer particles outside the desired narrow particle size distribution range, from previous batches that may also contain foaming agents, coating agents, or flameproofing agents. If such an addition is made, it is particularly beneficial to use the complexing agents mentioned. These so-called defective beads are preferably added in amounts from 0.01–10.0 wt.%, based on the amount of monomers used, with the organic phase.

Hydroxyethylcellulose or polyvinylpyrrolidone water-soluble protective colloids, are preferably used in the process of the invention. Other protective colloids can also be used, but the interfacial tension between styrene and the aqueous phase should not be lowered below 18 N/mm² by the addition of the protective colloid. The styrene/water interfacial tension is 32 N/mm². The use of protective colloids whose addition does not lower the interfacial tension between styrene and water to below 18 N/mm² has the advantage that it can be added even before beginning the polymerization. This guarantees adequate stabilization of the polymerization batch continuously. Spherical beads are formed in every case.

The protective colloids are used at concentrations between 0.01 and 0.3 wt.% based on the amount of water, preferably at concentrations between 0.05 and 0.15 wt.%. These substances should be completely soluble in water to form clear solutions in the specified concentration range at the temperatures between 25 and 125° C. prevailing during the polymerization process. The molecular weights of the protective colloids should be $M_w = 50,000$ to $1,000,000$, preferably 100,000 to 700,000, measured by high pressure liquid chromatography (HPLC).

In addition to the organic protective colloid, the system also contains an inorganic powder which is substantially insoluble in water, as a suspension stabilizer. Examples of suitable powders are finely divided tricalcium phosphates, barium phosphate, and calcium or barium sulfate. The weight ratio of organic protective colloid to inorganic suspension stabilizer is in the range of 1:1 to 1:5, especially from 1:2 to 1:4.

The organic protective colloids are suitably added to the aqueous phase together with the other components of the stabilizing system before beginning the polymerization. The organic phase is added with stirring and is then heated. Therefore, the system is sufficiently stable at any time during the polymerization. If the stirrer should fail, the separation of the aqueous and organic phases occurs so slowly that there is enough time to add a polymerization inhibitor. Styrene polymers are formed whose internal water content is extraordinarily low; generally between 0.3 and 1.0 wt.% (see Table 1).

In the process of the invention, the weight ratio of organic to aqueous phase should be in the range of 0.9:1 to 1.25:1, preferably in the range of about 1:1.

The monomers and optionally defective beads are contained in the organic phase. Suitable monomers are styrene and monomer mixtures that contain at least 50 wt.% styrene and additional comonomers such as styrene derivatives copolymerizable with styrene, for example alpha-methylstyrene, divinylbenzene, isopropenylbenzene, p-methylstyrene, or ring-halogenated styrenes.

The organic phase also contains the monomer-soluble catalysts; these are ordinarily one or more radial-forming substances, for example t-butyl perbenzoate, t-butyl perisononanoate, di-t-butyl peroxide, dibenzoyl peroxide, or mixtures of these. They are used in conventional amounts of 0.2 to 1, especially from 0.3 to 0.6 wt.% based on the organic phase. Other suitable examples are so-called azo catalysts such as azoisobutyronitrile.

The polymerization is carried out by known processes at temperatures of 80 to 130° C. The polymerization can be started initially at a temperature of 80° to 90° C., and can be raised during the polymerization to 90 to 120° C.

The styrene polymers can also contain organic halogen compounds as flameproofing agents, such as brominated oligomers of butadiene or of isoprene. The flameproofing agents are preferably added in amounts of 0.02-1.0 wt.% based on the amount of monomer used.

Typical representatives that can be mentioned are: 1,2,5,6-tetrabromocyclodecane, 1,2,5,6,9,10-hexabromocyclododecane, brominated polybutadiene with a degree of polymerization of up to 15, for example, and 1-($\alpha,\beta$-dibromoethyl)-3,4-dibromocyclohexane. It may be beneficial to add substances with a synergistic action such as di-t-butyl peroxide, dicumyl peroxide, poly-p-diisopropylbenzene, etc.

In the production of expandable styrene polymers, liquid or gaseous organic compounds are added to the polymerization mixture that do not dissolve the styrene polymer and whose boiling point is below the softening point of the polymer, for example $C_{1-6}$ aliphatic hydrocarbons such as propane, butane, pentane, hexane, cyclohexane, or halogenated hydrocarbons such as methyl chloride, dichlorodifluoromethane, trichloromonofluoromethane, or 1,2,2,-trifluoro-1,1,2-trichloroethane. Mixtures of foaming agents can also be used. The foaming agents are ordinarily used in amounts of 2 to 20 wt.%, preferably 3 to 12 wt.% based on the monomers.

The expandable styrene polymers can also contain additives such as dyes, fillers, and regulators for the foam porosity such as epoxyalkanes. The expandable styrene polymers after production are present in spherical form and generally have a particle diameter of 0.3 to 3 mm, preferably 0.4 to 2.5 mm. They can be foamed further by the usual processes in the prefoamed state by heating in molds that do not close gas-tight, and can be sintered to form foamed objects that conform in dimensions to the inner cavity of the mold used.

Beads formed by the polymerization can also be coated in the usual way, for example with esters of stearic acid and/or metal salts such as zinc stearate.

Other features of the invention will become apparent in the course of the following descriptions of the exemplary embodiments which are given for illustration of the invention and are not intended to be limiting thereof.

EXAMPLES 1.1 Polymerization in the presence of foaming agents

For each 100 parts by weight of water, the amounts of organic protective colloid and finely divided tricalcium phosphate indicated in Table 1, and $1 \times 10^{-2}$ parts by weight of ethylenediaminetetraacetic acid were mixed in a suitable powder mixture. This powdered mixture was then placed in a stirred tank in which 100 parts by weight of completely deionized water had been placed. Some time (approximately 5 minutes) before adding the organic phase, the appropriate amount of buffer substance, as noted in Table 1, was added to the aqueous phase.

100 parts of styrene in which were dissolved 0.30 parts of dibenzoyl peroxide and 0.15 parts of t-butyl perbenzoate was then added with stirring. This mixture was polymerized for 4 hours at 90° C. and 6 hours at 115° C. with stirring.

Three hours after reaching 90° C., 7 parts of a mixture of n-pentane and isopentane were added. After completion of the polymerization, the stirred tank was drained and the external water was removed from the polymer particles.

The internal water is determined as follows:

A sample of the expandable polystyrene was treated with methanol for 2 minutes to remove traces of external water, dried by suction on a filter, and dried for 5 minutes with a stream of air at 20° C. in countercurrent.

The sample thus prepared was then titrated by the "Karl Fischer" method.

1.2 Polymerization in the absence of foaming agents

In a stirred reactor, 0.16 part of hydroxyethylcellulose ($M_w$=150,000, according to HPLC), 0.40 part of tricalcium phosphate, and 0.01 part of ethylenediaminetetraacetic acid, as well as the amount of buffer substance indicated in Table 1, were added to 100 parts of completely deionized water. 100 parts of styrene in which were dissolved 0.27 part of dibenzoyl peroxide and 0.1 part of t-butyl perbenzoate was then added with stirring. This mixture was polymerized for 7 hours with stirring at 90° C.

The bead-shaped polymeric product obtained was separated from the water phase by filtering, was dried, and screened. The results are given in Table 2.

TABLE 1

| Experiment No. | HEC[1] (%) | TCP[2] (%) | Carbonate or Bicarbonate added type | conc. (ppm) | d'[3] (mm) | Angle[4] | H$_2$O (%) | Bead form[5] |
|---|---|---|---|---|---|---|---|---|
| 1 comparison | 0.05 | 0.125 | — | — | 1.4 | 78 | 1.1 | R/F |
| 1 invention | 0.05 | 0.125 | CaCO$_3$ | 100 | 1.4 | 84 | 1.0 | R |
| 2 comparison | 0.05 | 0.125 | CaCO$_3$ | 300 | 1.7 | 84 | 0.9 | R |
| 3 invention | 0.05 | 0.125 | Na$_2$CO$_3$ | 300 | 1.6 | 81 | 0.8 | R |
| 2 comparison | 0.05 | 0.25 | — | — | 0.9 | 79 | 1.2 | R |
| 4 invention | 0.05 | 0.25 | CaCO$_3$ | 200 | 1.4 | 84 | 0.9 | R |
| 3 comparison | 0.10 | 0.25 | — | — | 0.9 | 77 | 1.1 | R |
| 5 invention | 0.10 | 0.25 | CaCO$_3$ | 300 | 1.2 | 85 | 0.9 | R |

[1]HEC = Hydroxyethylcellulose ($M_w$ = 150,000 from HPLC)
[2]TCP = Tricalcium phosphate
[3]Average particle size with 36.8% screen residue
[4]Angle of the lines of distribution in the RRSB grid
[5]R = Round, F = Flat

TABLE 2

| Experiment No. | Carbonate or bicarbonate added type | conc. (ppm) | d'[3] (mm) | Angle[4] |
|---|---|---|---|---|
| 1 comparison | — | — | 0.6 | 70 |
| 1 invention | CaCO$_3$ | 100 | 0.7 | 78 |
| 2 invention | CaCO$_3$ | 200 | 0.9 | 79 |
| 3 invention | CaCO$_3$ | 300 | 1.2 | 80 |
| 4 invention | BaCO$_3$ | 300 | 1.0 | 80 |
| 5 invention | MgCO$_3$ | 300 | 1.4 | 75 |
| 6 invention | MnCO$_3$ | 300 | 1.5 | 73 |
| 7 invention | CuCO$_3$ | 300 | 1.9 | 78 |
| 8 invention | Na$_2$CO$_3$ | 300 | 0.9 | 78 |
| 9 invention | NaHCO$_3$ | 300 | 0.9 | 79 |
| 10 invention | K$_2$CO$_3$ | 300 | 1.1 | 80 |
| 11 invention | KHCO$_3$ | 300 | 0.8 | 79 |

[3]Average particle size with 36.8% screen residue
[4]Angle of the lines of distribution in the RRSB grid The process of the present invention leads to particles with a substantially narrowed particle size distribution as seen clearly from the slope of the lines of distribution in the RRSB grid in both tables. Since polymerization 1.2 was carried out on a laboratory scale, the values for the slope of the lines of distribution in Table 2, or in the comparison experiment, are smaller, but the relationship between the comparison experiment and experiments pursuant to the invention is practically the same in both tables.

Consequently, the particle size spectrum can be narrowed significantly by the process of the invention compared with the state of the art.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for producing styrene-containing polymers having a narrow particle size distribution, comprising the steps:
   (i) preparing a polymerization mixture, said mixture comprising
      a) an organic phase comprising at least 50 wt.% styrene and a monomer-soluble polymerization initiator, and
      b) an aqueous phase comprising water, a water soluble organic protective colloid and a substantially water insoluble inorganic suspension stabilizer;
   (ii) adding to said polymerization mixture 100–300 ppm of a metal carbonate, bicarbonate or mixtures thereof based on said aqueous phase; and
   (iii) polymerizing said polymer mixture to produce said styrene-containing polymer particles.

2. The process of claim 1, wherein said carbonate or bicarbonate is selected from the group consisting of sodium, calcium, potassium, magnesium, barium, zinc and copper carbonates and bicarbonates.

3. The process of claim 3, wherein said carbonate or bicarbonate is selected from the group consisting of calcium, magnesium, zinc and copper carbonates and bicarbonates.

4. The process of claim 1, wherein said organic protective colloid is hydroxyethylcellulose or polyvinylpyrrolidone.

5. The process of claim 1, wherein said inorganic suspension stabilizer is selected from the group consisting of calcium phosphates, barium phosphate, calcium sulfate and barium sulfate.

6. The process of claim 1, further comprising adding liquid or gaseous organic foaming agents to said polymerization mixture.

7. The process of claim 6, wherein said foaming agents are $C_{1-6}$ aliphatic hydrocarbons or halogenated hydrocarbons whose boiling point is below the softening point of said styrene-containing polymer.

8. The process of claim 1, further comprising adding oversized or undersized polymer beads to said polymerization mixture.

9. The process of claim 1, further comprising adding a complexing agent to said polymerization mixture to remove undesired extraneous ions before said adding step.

10. The process of claim 10, wherein said complexing agent is an aminopolycarboxylic acid.

11. The process of claim 1, further comprising adding a flame proofing agent to said polymerization mixture during said preparing step.

12. The process of claim 11, wherein said flame proofing agent is a halogenated organic compound.

* * * * *